United States Patent
Mori et al.

(10) Patent No.: US 12,360,132 B2
(45) Date of Patent: Jul. 15, 2025

(54) AUTOMATIC ANALYZER

(71) Applicant: Hitachi High-Tech Corporation, Tokyo (JP)

(72) Inventors: Takamichi Mori, Tokyo (JP); Syotaro Sagawa, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 936 days.

(21) Appl. No.: 17/276,952

(22) PCT Filed: Jan. 30, 2020

(86) PCT No.: PCT/JP2020/003384
§ 371 (c)(1),
(2) Date: Mar. 17, 2021

(87) PCT Pub. No.: WO2020/170751
PCT Pub. Date: Aug. 27, 2020

(65) Prior Publication Data
US 2022/0034926 A1  Feb. 3, 2022

(30) Foreign Application Priority Data

Feb. 18, 2019 (JP) ................................ 2019-026313

(51) Int. Cl.
*G01N 35/10* (2006.01)
(52) U.S. Cl.
CPC ..... *G01N 35/1004* (2013.01); *G01N 35/1002* (2013.01)
(58) Field of Classification Search
CPC .. G01N 35/1002; G01N 35/1004; B08B 3/02; B08B 3/04
See application file for complete search history.

(56) References Cited

U.S. PATENT DOCUMENTS 5,474,744 A * 12/1995 Lerch ................. G01N 35/1004
                                                      73/864.22
2005/0279387 A1  12/2005 Blackwell et al.
(Continued)

FOREIGN PATENT DOCUMENTS

JP    53-057893 U    5/1978
JP    04-078558 U    7/1992
(Continued)

OTHER PUBLICATIONS

International Search Report of PCT/JP2020/003384 dated Mar. 4, 2020.

*Primary Examiner* — Elizabeth A Robinson
*Assistant Examiner* — Austin Q Le
(74) *Attorney, Agent, or Firm* — MATTINGLY & MALUR, PC

(57) ABSTRACT

It is possible to maintain, in clean condition, a solenoid valve for discharge of cleaning fluid accumulated in a vacuum bottle in which the cleaning fluid adhering to a probe collects. An automatic analyzer includes: a cleaning bath that has a cleaning fluid outlet from which cleaning fluid is discharged for cleaning a probe, and a vacuum suction port into which the probe is inserted; a cleaning tank that stores the cleaning fluid; a vacuum tank; a vacuum pump that causes the vacuum tank to be placed under negative pressure with respect to atmospheric pressure; a vacuum bottle placed between the vacuum suction port and the vacuum tank; and, as channels through which the cleaning fluid flows into the vacuum bottle, a first channel connected to the vacuum suction port and a second channel connected to the cleaning tank.

13 Claims, 15 Drawing Sheets

(56) References Cited

U.S. PATENT DOCUMENTS

| | | |
|---|---|---|
| 2008/0099057 A1 | 5/2008 | Dunfee et al. |
| 2015/0346231 A1 | 12/2015 | Mori et al. |
| 2017/0010293 A1* | 1/2017 | Mori ................ G01N 35/1002 |
| 2019/0049477 A1 | 2/2019 | Muramatsu et al. |
| 2019/0339296 A1 | 11/2019 | Mori et al. |
| 2020/0386779 A1 | 12/2020 | Inaba et al. |

FOREIGN PATENT DOCUMENTS

| | | |
|---|---|---|
| JP | 06-167504 A | 6/1994 |
| JP | 3282248 B2 * | 6/1994 |
| JP | 2002340913 A * | 11/2002 |
| JP | 2005-257491 A | 9/2005 |
| JP | 2005-308506 A | 11/2005 |
| JP | 2008-503721 A | 2/2008 |
| JP | 2018-159682 A | 10/2018 |
| WO | 2014/112591 A1 | 7/2014 |
| WO | 2017/145672 A1 | 8/2017 |
| WO | 2018/155042 A1 | 8/2018 |

* cited by examiner

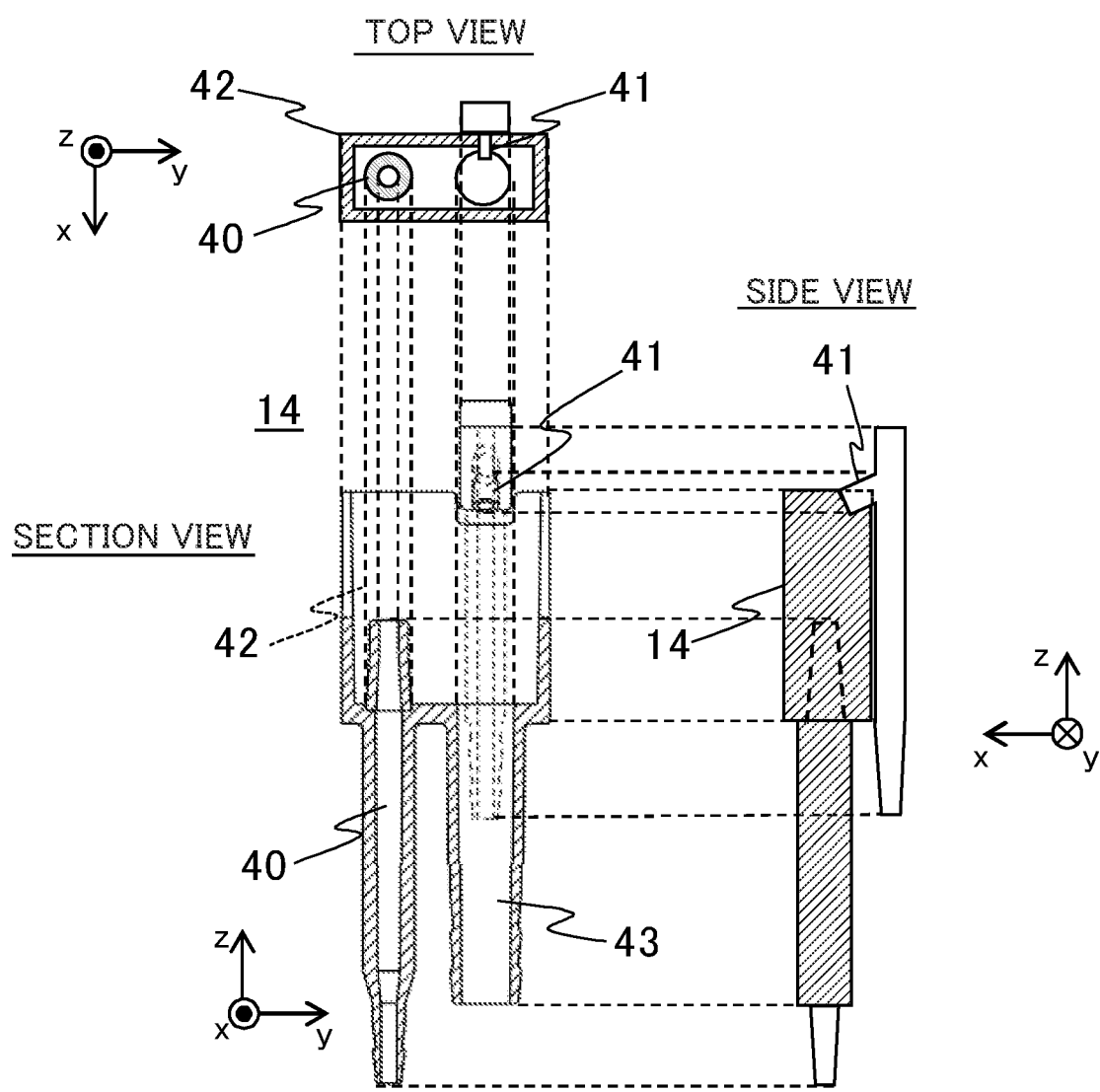

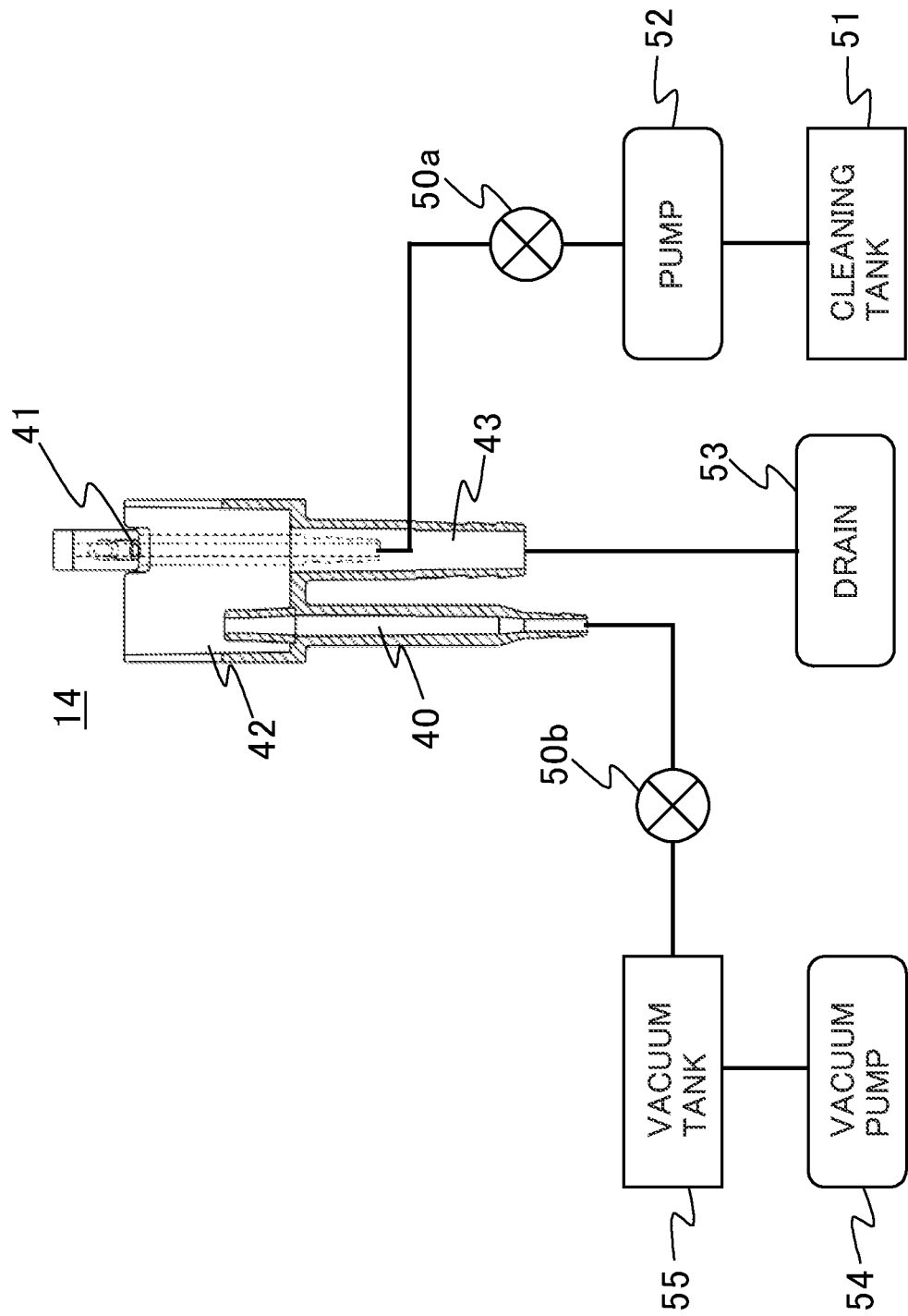

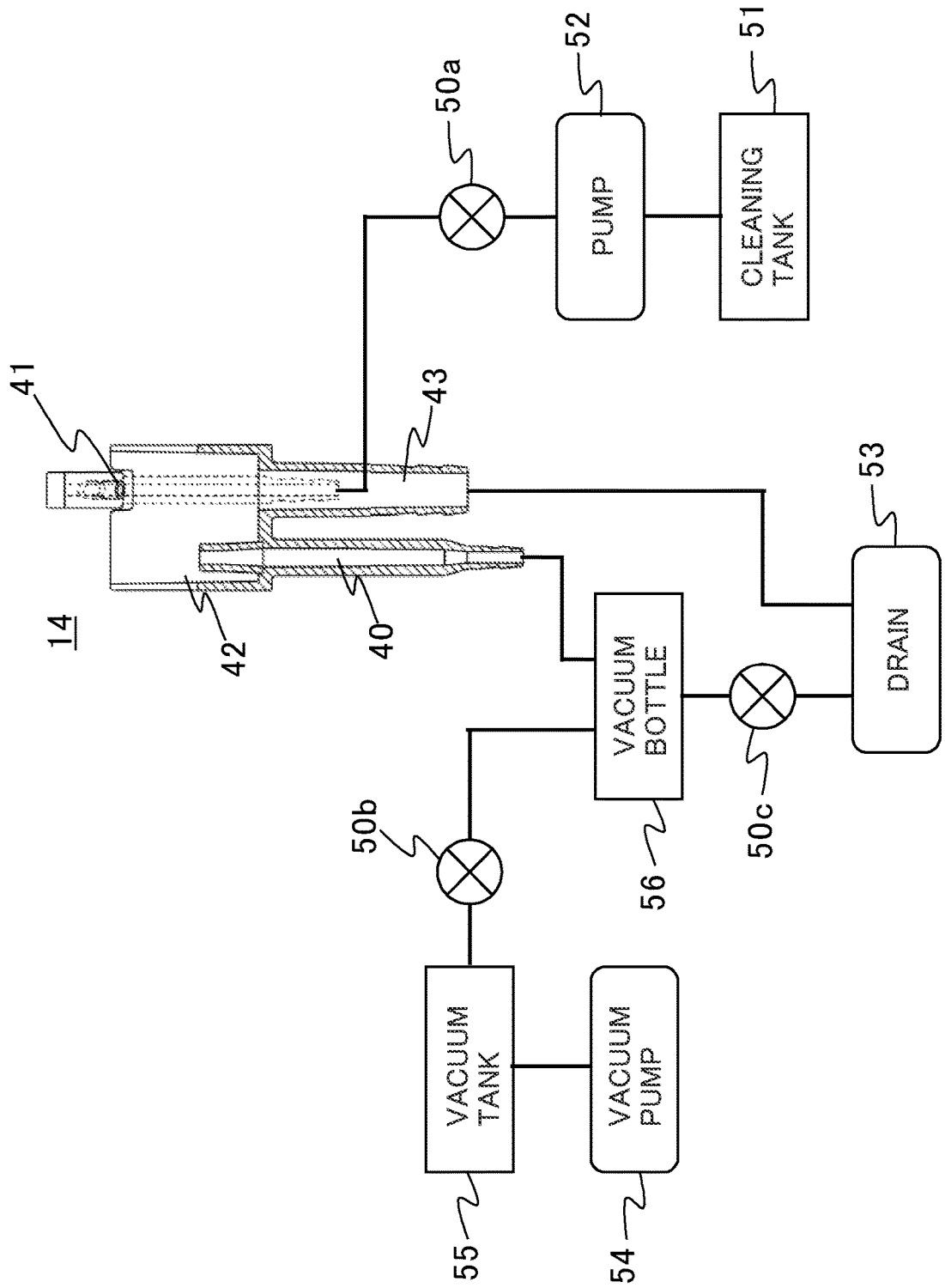

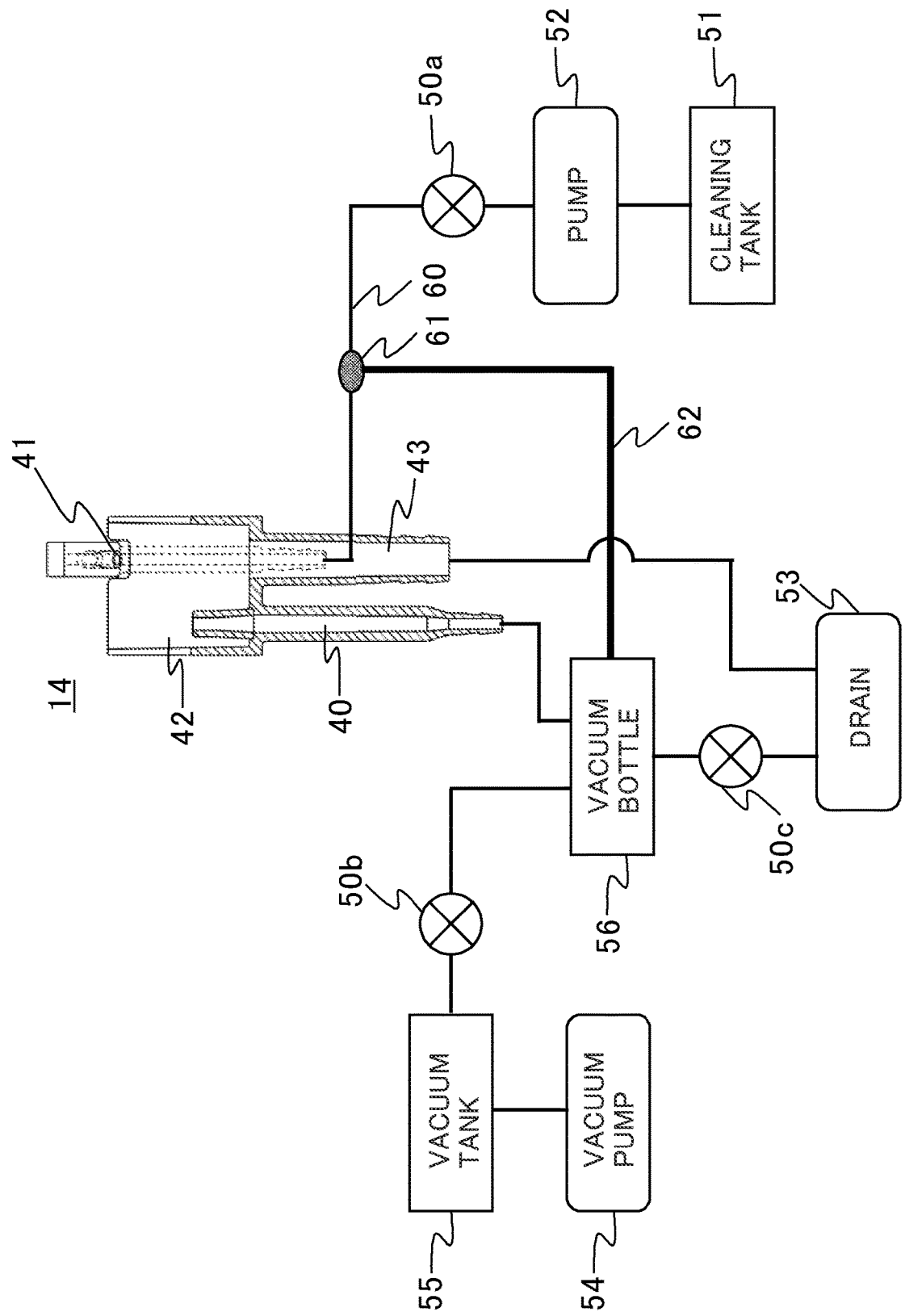

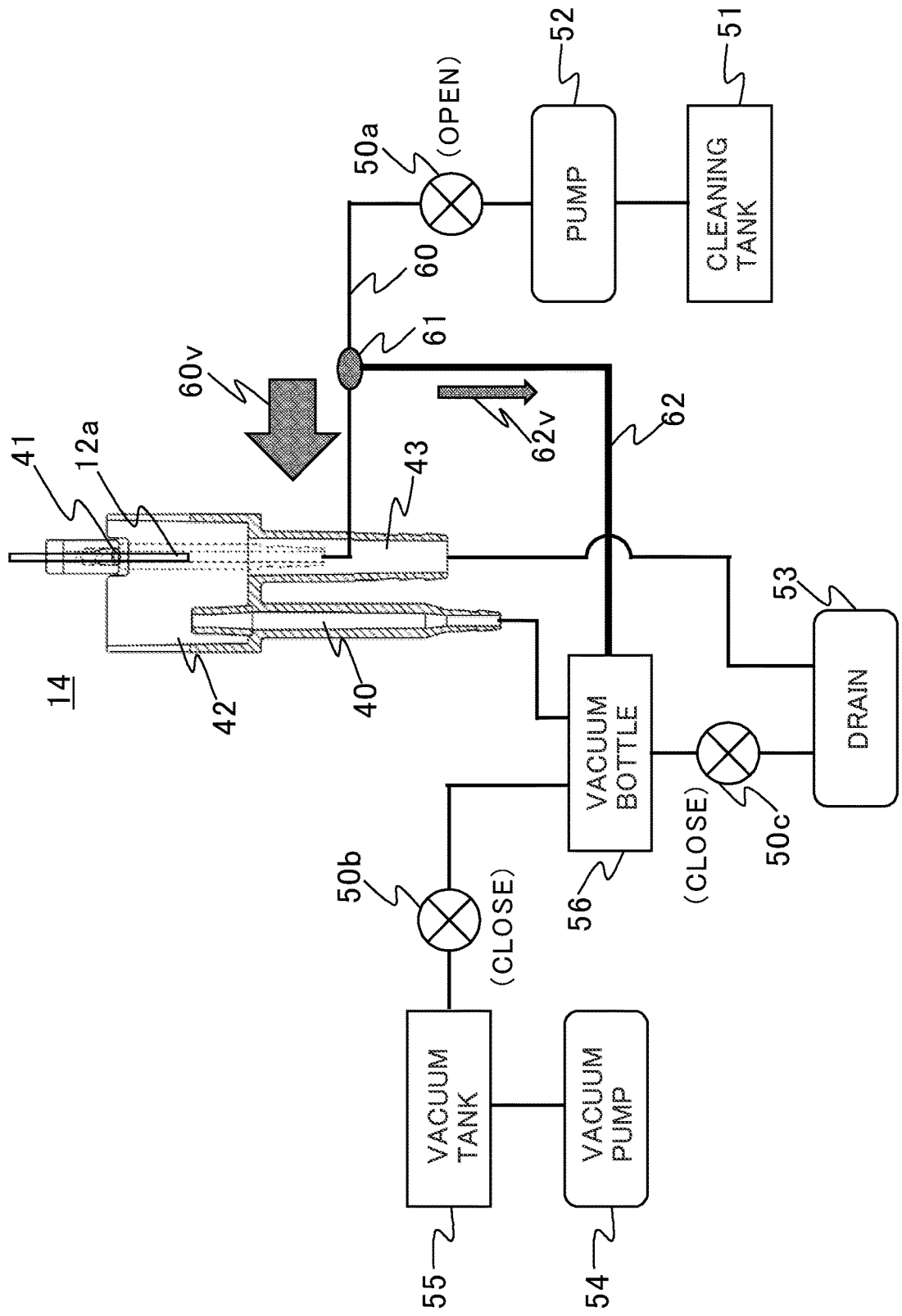

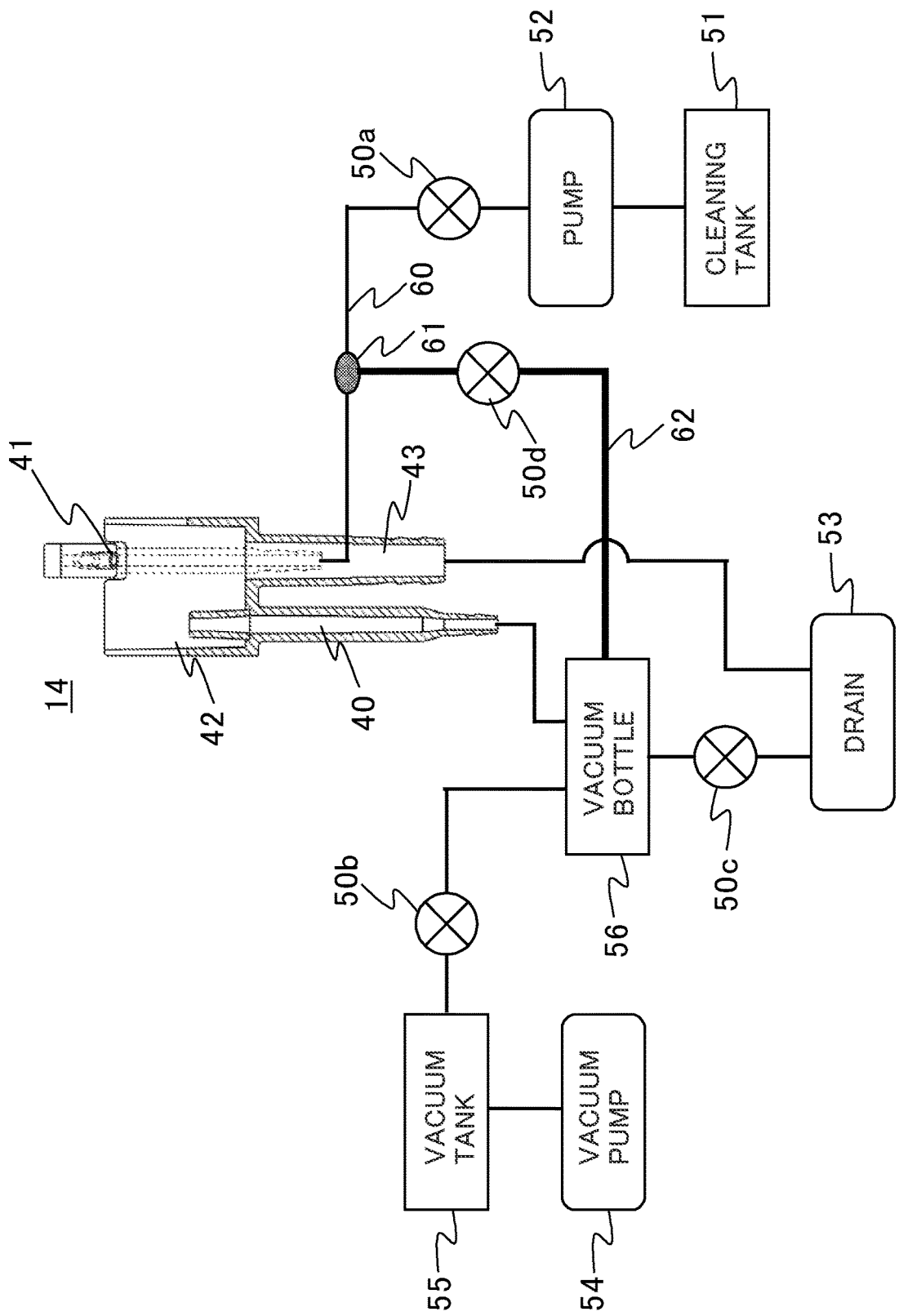

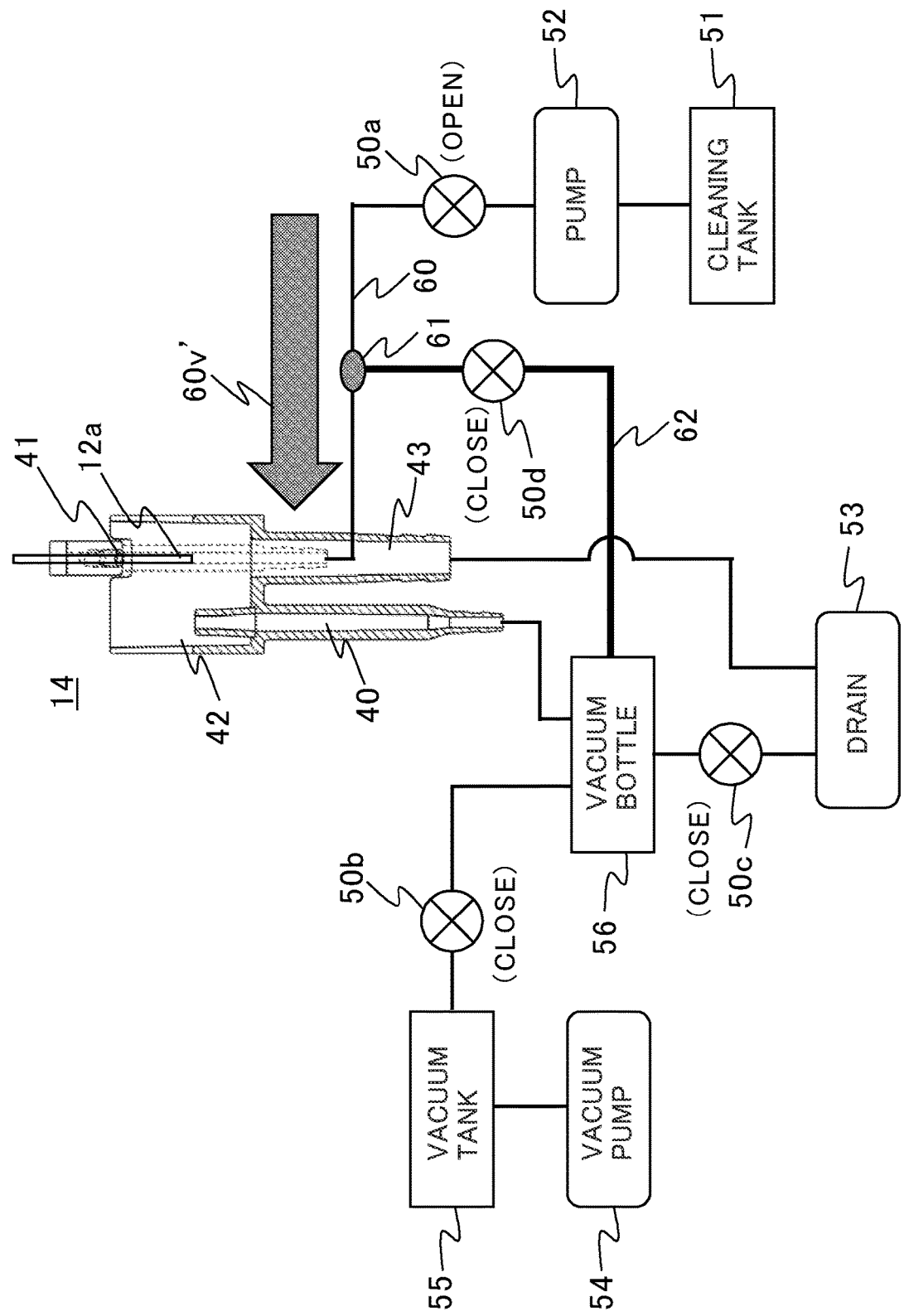

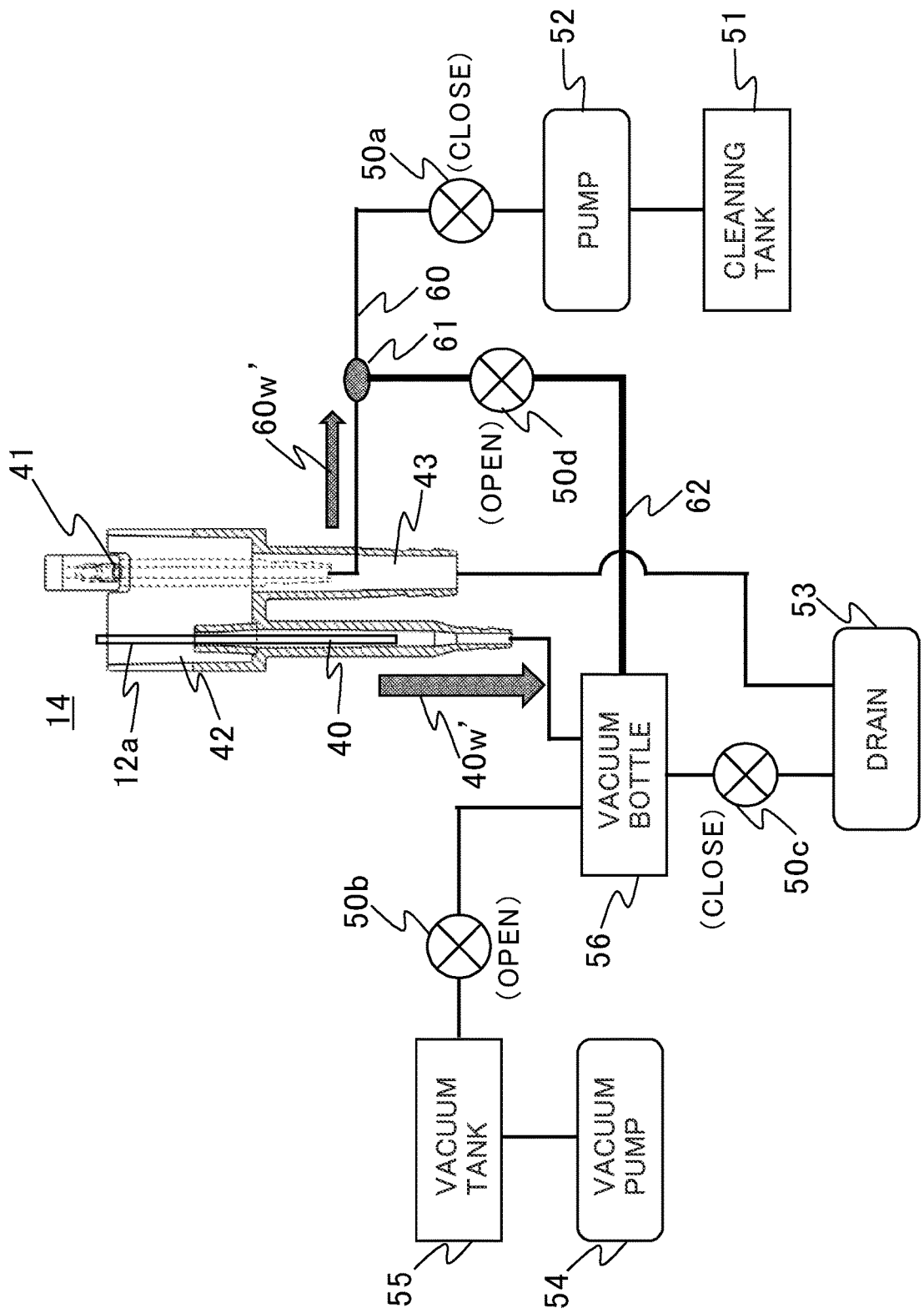

AUTOMATIC ANALYZER

TECHNICAL FIELD

The present invention relates to an automatic analyzer that analyzes a liquid sample such as blood, urine and the like to determine a concentration of a predetermined component contained therein, and the like.

BACKGROUND ART

Patent Literature 1 discloses a technique in which a vacuum tank is connected to a vacuum pump to maintain the pressure in the vacuum tank at a negative pressure, and then the vacuum pressure in the vacuum tank is used to suck a cleaning fluid or the like (waste fluid) discharged when a reaction container is cleaned.

In the disclosure of Patent Literature 1, a reaction liquid or a cleaning fluid is temporarily stored in a suction bottle in a reaction container cleaning mechanism using a large amount of cleaning fluid, and a solenoid valve is opened to discharge the waste fluid which is stored in the suction bottle.

CITATION LIST

Patent Literature

Patent Literature 1: Japanese Patent Application Laid-Open No. 2005-308506

SUMMARY OF INVENTION

Technical Problem

In the automatic analyzer disclosed in Patent Literature 1, a cleaning drying bath in which a sample probe is cleaned is configured to be connected to a vacuum tank so that waste fluid produced by cleaning the sample probe collects in the vacuum tank.

In the automatic analyzer, after a sample is aspirated and ejected by a sample probe, the interior and exterior of the probe is cleaned with a cleaning fluid in order to prevent contamination between analytes (test samples). When the sample is aspirated by the sample probe, the leading end of the sample probe is inserted into a sample container for aspiration. The sample probe may be inserted to a depth of several millimeters from the liquid surface of the sample for aspiration, or otherwise it may perform aspiration around the bottom of a test tube containing the sample. In the latter case, because a wide range of the sample probe has to be cleaned, the cleaning fluid is applied to the sample probe which is being moved down and up so that the entire sample probe is cleaned. For this purpose, the amount of cleaning fluid adheres to the exterior of the probe which has been cleaned, is greater in comparison to the former case where only the leading end is cleaned. If the next sample is aspirated by the probe with the cleaning fluid adhering to its exterior, the sample will be diluted with the cleaning fluid. Therefore, the cleaning fluid is required to be removed speedily by vacuum suction.

The configuration disclosed in Patent Literature 1 may be adequate as long as the amount of waste fluid produced by cleaning a sample probe is small. However, the waste fluid collects in the vacuum tank and therefore periodical removal of waste fluid is required. The removal of waste fluid produces a need to draw anew vacuum on the vacuum tank.

Therefore, if there is a likelihood of a large amount of waste fluid, the cleaning drying bath and the vacuum tank are desirably connected to each other via a vacuum bottle to prevent the cleaning fluid (waste fluid) as much as possible from being drawn into the vacuum tank by vacuum suction. However, the amount of waste fluid produced by cleaning the sample probe is not much in comparison to, for example, the amount of waste fluid discharged from the reaction container cleaning mechanism. For the purpose of discharging the waste fluid collecting in the vacuum bottle, a solenoid valve installed in the vacuum bottle is opened to suck air through a vacuum suction port for extrusion of the waste fluid collecting in the vacuum bottle. However, if the amount of collecting waste fluid is small and in turn the rate of flow through the solenoid valve is small, the solenoid valve may be clogged with dust and/or the like in the air coming in through the vacuum suction port. If dust and/or the like adheres to a valve seat of the solenoid valve, it is likely that the negative pressure in the vacuum tank does not reach a preset value because of a leak from the solenoid valve even if the vacuum pump is operated with the solenoid valve closed. In some cases, an apparatus alarm may possibly be generated by a sensor monitoring a negative pressure state, or the like.

Solution to Problem

An automatic analyzer according to an embodiment of the present invention includes: a cleaning bath that has a cleaning fluid outlet from which cleaning fluid is discharged for cleaning a probe, and a vacuum suction port into which the probe is inserted; a cleaning tank that stores the cleaning fluid; a vacuum tank; a vacuum pump that causes the vacuum tank to be placed under negative pressure with respect to atmospheric pressure; a vacuum bottle placed between the vacuum suction port and the vacuum tank; and as channels through which the cleaning fluid flows into the vacuum bottle, a first channel connected to the vacuum suction port and a second channel connected to the cleaning tank.

Advantageous Effects of Invention

It is possible to provide an automatic analyzer with high reliability because a solenoid valve for discharge of cleaning fluid collecting in a vacuum bottle can be maintained in clean condition, the vacuum bottle receiving the cleaning fluid adhering to a probe.

These and other challenges and new features will be apparent from the description and the accompanying drawings of the specification.

BRIEF DESCRIPTION OF DRAWINGS

FIG. 2 is a diagram illustrating the structure of a cleaning bath.

FIG. 3A is a diagram illustrating a channel configuration of a cleaning bath (first comparative example).

FIG. 3B is a diagram illustrating a channel configuration of a cleaning bath (second comparative example).

FIG. 4A is a diagram illustrating a channel configuration of a cleaning bath (first example).

FIG. 4B is a diagram illustrating the operation of a channel configuration of a cleaning bath during cleaning of an exterior of a probe.

FIG. 7A is a diagram illustrating another channel configuration of a cleaning bath (first example).

FIG. 7B is a diagram illustrating the operation of a channel configuration of a cleaning bath during cleaning of an exterior of a probe.

FIG. 7C is a diagram illustrating the operation of a channel configuration of a cleaning bath during vacuum suction

DESCRIPTION OF EMBODIMENTS

Figure 1:
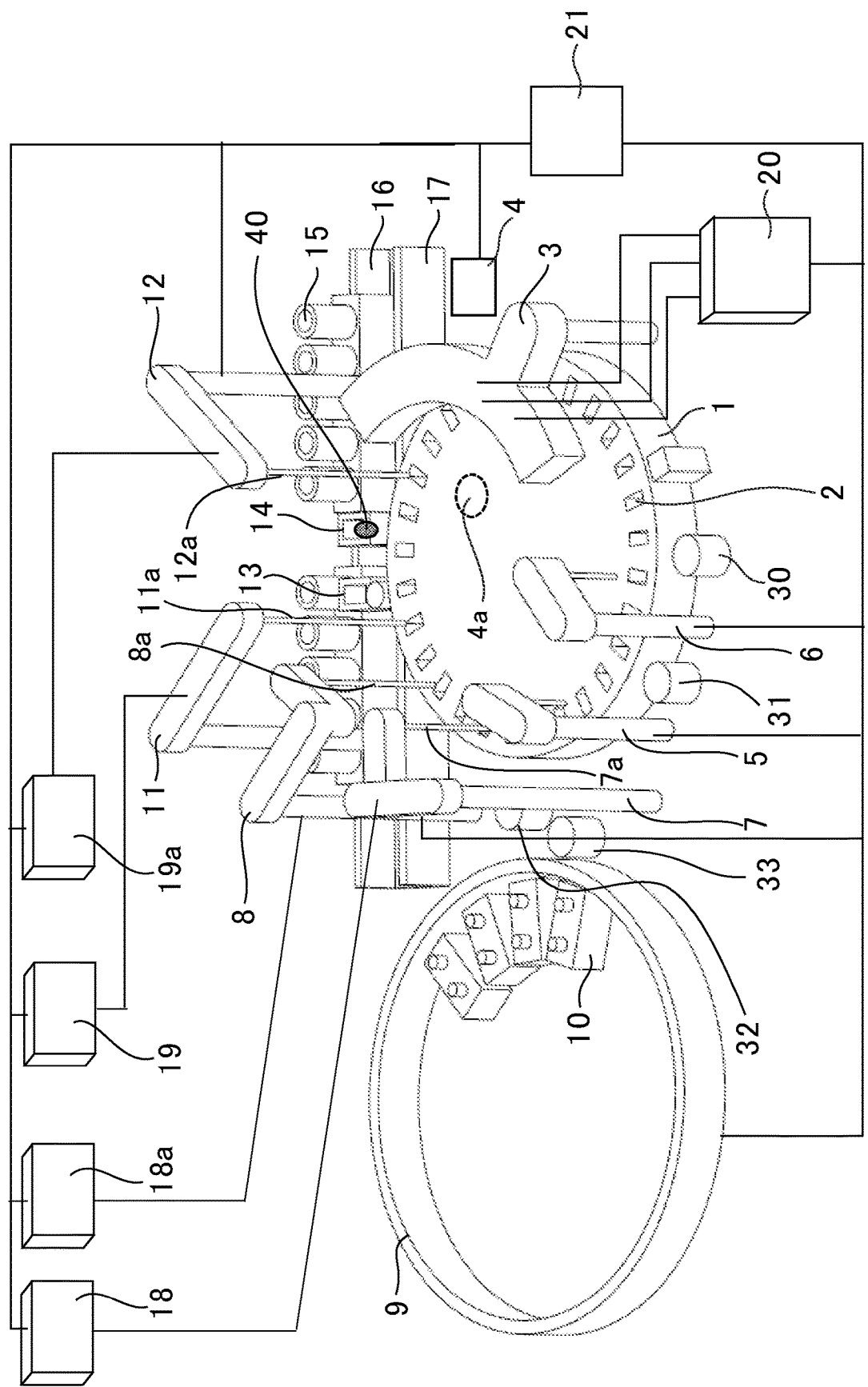
FIG. 1 is a diagram illustrating an overall configuration of an automatic analyzer.

FIG. 1 is a perspective view of an automatic analyzer. The automatic analyzer is an apparatus used to dispense a sample and a reagent into a plurality of reaction containers 2 to initiate a reaction between them, and then measure the reacted liquid. The automatic analyzer includes a reaction disk 1, a reagent disk 9, a sample transport mechanism 17, reagent dispense mechanisms 7, 8, reagent syringes 18, 18a, sample dispense mechanisms 11, 12, sample syringes 19, 19a, a cleaning mechanism 3, a light source 4a, a spectrophotometer 4, agitation mechanisms 5, 6, a cleaning pump 20, cleaning baths 13, 14, 30, 31, 32, 33, a vacuum suction port 40, and a controller 21.

In the reaction disk 1, the reaction containers 2 are arranged on the circular circumference. The sample transport mechanism 17 is installed near the reaction disk 1 to move a rack 16 which is loaded with sample containers 15. The sample containers 15 contain test samples (analytes) such as blood or the like, and the sample containers 15 are loaded on the rack 16 to be transported by the sample transport mechanism 17. The sample dispense mechanism 11 and the sample dispense mechanism 12, which are rotatable and vertical movable, are installed between the reaction disk 1 and the sample transport mechanism 17. The sample dispense mechanisms 11, 12 include sample probes 11a, 12a connected to the sample syringes 19, 19a, respectively. Each of the sample probes 11a, 12a moves along an arc around the rotational axis of the corresponding sample dispense mechanism 11, 12 in order to dispense a sample from the sample container 15 to the reaction container 2.

A plurality of reagent bottles 10 is capable of being loaded on the circular circumference of the reagent disk 9. The reagent disk 9 is held at cool temperatures. The rotatable and vertical movable reagent dispense mechanisms 7, 8 are installed between the reaction disk 1 and the reagent disk 9. The reagent dispense mechanisms 7, 8 include reagent probes 7a, 8a connected to the reagent syringes 18, 18a, respectively. Each of the reagent probes 7a, 8a moves along an arc around the rotational axis of the corresponding reagent dispense mechanism 7, 8 in order to access the reagent disk 9 for dispensing of a reagent from the reagent bottle 10 to the reaction container 2.

Disposed around the reaction disk 1 are: the cleaning mechanism 3 that cleans only the reaction containers after use in measurement; agitation mechanisms 5, 6 that perform agitation of a liquid mixture (reaction liquid) of a reagent and a sample in the reaction container; and the light source 4a and the spectrophotometer 4 that irradiate the liquid mixture (reaction liquid) in the reaction container with light and measures the absorbance, for example. Further, the cleaning pump 20 is connected to the cleaning mechanism 3. The cleaning baths 13, 14, 33, 32, 31, 30 are disposed respectively within operating ranges of the sample dispense mechanisms 11, 12, the reagent dispense mechanisms 7, 8 and the agitation mechanisms 5, 6. Each mechanism of the automatic analyzer is connected to and controlled by the controller 21.

A process of analyzing a test sample by an automatic analyzer is typically executed in the following order. Initially, a sample container 15 loaded on the rack 16 is transported to a position close to the reaction disk 1 by the sample transport mechanism 17, and the sample in the sample container 15 is dispensed to the reaction container 2 on the reaction disk 1 by the sample probe 11a of the sample dispense mechanism 11. Subsequently, using the reagent probe 7a of the reagent dispense mechanism 7 or the reagent probe 8a of the reagent dispense mechanism 8, a reagent to be used in analysis is dispensed from the reagent bottle 10 on the reagent disk 9 to the reaction container 2 in which the sample has already been dispensed. Subsequently, the liquid mixture of the sample and the reagent in the reaction container 2 is agitated by the agitation mechanism 5.

After that, the light emitted from the light source 4a is transmitted through the reaction container 2 containing the liquid mixture, and a light intensity of the transmitted light is measured by the spectrophotometer 4. The light intensity measured by the spectrophotometer 4 is transmitted to the controller 21 via an A/D convertor and an interface. The controller 21 performs computations to calculate, from the absorbance of the liquid mixture (reaction liquid), a concentration of a component designated by an analysis item corresponding to the reagent, and/or the like. The measurement result thus obtained is displayed on a display unit (not shown) and/or the like.

In this example, the sample probe 11a aspirating a sample in the sample container 15 is for aspiration from an upper portion of the sample container 15, and the sample probe 12a is for aspiration from the vicinity of the bottom of the sample container 15. Because of this, for the sample probe 12a which has been used to dispense a sample, a need arises to clean a wide range of the sample probe in the cleaning bath 14 in order to prevent contamination between samples. After the cleaning of the wide range, because a large amount cleaning fluid adheres to the sample probe 12a, the vacuum suction port 40 is installed in the cleaning bath 14 so that the cleaning fluid adhering to the sample probe 12a is removed to prevent the sample from being diluted with the cleaning fluid.

FIG. 2 illustrates the structure of the cleaning bath 14, in which a section view, a top view and a side view are shown. A drainage tube 43 and the vacuum suction port 40 are installed in the bottom of a bath 42. A cleaning fluid outlet 41 is also installed in the vicinity of the bath 42. The sample probe 12a is inserted into the bath 42 in the vicinity of the cleaning fluid outlet 41, and while the sample probe 12a is being moved up and down, the entire contaminated range of the exterior of the sample probe 12a is cleaned up. The cleaning fluid used for cleaning is discharged from the drainage tube 43. Then, the sample probe 12a is moved to the vacuum suction port 40, and then is moved up and down to remove the cleaning fluid adhering to the sample probe 12a. In this example, when viewed from the top of the bath 42, the vacuum suction port 40 is installed in a different position from the position where the cleaning fluid is ejected from the cleaning fluid outlet 41, and the drainage tube 43 is installed in the position where the cleaning fluid is ejected from the cleaning fluid outlet 41. This minimizes the risk that a test sample adhering to the exterior of the sample probe 12a enters the vacuum suction port 40.

FIG. 3A illustrates a channel configuration of the cleaning bath 14 (first comparative example). The cleaning fluid is stored in a cleaning tank 51, and is supplied to the cleaning fluid outlet 41 of the cleaning bath 14 by a pump 52. A first solenoid valve 50a is installed between the pump 52 and the cleaning fluid outlet 41. The drainage tube 43 is connected to a drain 53. A vacuum pump 54 and a vacuum tank 55 are also installed for vacuum suction, and a second solenoid valve 50b is installed between the vacuum tank 55 and the vacuum suction port 40. In the channel configuration, the cleaning fluid adhering to the side face of the sample probe 12a collects directly in the vacuum tank 55. This gives rise to a need to remove the cleaning fluid collecting in the vacuum tank 55 after the repetitive vacuum suction operation is repeatedly performed. Also, the second solenoid valve 50b sucks predominantly air from the vacuum suction port 40. Therefore, there is a risk of dust and/or the like in the air being caught in a valve portion of the second solenoid valve 50b, and at worst the hermetic performance of the second solenoid valve 50b may be decreased, and in turn a leak from the second solenoid valve 50b may occur to decrease the vacuum performance in the process of using the vacuum pump 54 to generate a negative pressure in the vacuum tank 55.

FIG. 3B illustrates another channel configuration of the cleaning bath 14 (second comparative example). A point of difference from the channel configuration in FIG. 3A is that a vacuum bottle 56 is disposed to prevent the cleaning fluid adhering to the side face of the sample probe 12a from being accumulated directly in the vacuum tank 55. The cleaning fluid adhering to the sample probe 12a is temporarily stored in the vacuum bottle 56. Then, a third solenoid valve 50c installed between the vacuum bottle 56 and the drain 53 is opened for discharge into the drain 53. This eliminates a situation in which the cleaning fluid collects in the vacuum tank 55. However, as in the case of the second solenoid valve 50b in FIG. 3A, there still remains the risk of dust and/or the like being caught in the third solenoid valve 50c. Decreasing the hermetic performance of the third solenoid valve 50c may give rise to a defective condition such as a reduction in vacuum suction power and backflow of the cleaning fluid from the drain 53 toward the vacuum bottle 56.

First Example

FIG. 4A illustrates a channel configuration of the cleaning bath 14 according to a first example. In the channel configuration according to the first example, a branch point 61 is installed in a channel 60 through which the cleaning fluid in the cleaning tank 51 is delivered to the cleaning fluid outlet 41 by the pump 52, and the channel 60 and the vacuum bottle 56 are connected to each other by a bypass passage 62. Specifically, two routes are provided for the channels for inflow of the cleaning fluid into the vacuum bottle 56, which have a channel for inflow of the cleaning fluid from the cleaning tank as well as a channel connected to the vacuum suction port 40.

FIG. 4B illustrates the operation of the channel configuration of the cleaning bath 14 when the exterior of the sample probe 12a is cleaned. At this time, the cleaning fluid is ejected from the cleaning fluid outlet 41 toward the sample probe 12a inserted in the cleaning bath 14, and the vacuum suction operation is not performed. By turning the first solenoid valve 50a to Open (open position), the cleaning fluid is ejected from the cleaning fluid outlet 41. At this time, the cleaning fluid flows into the vacuum bottle 56 after the cleaning fluid is extruded from pump 52 into a bypass passage 62 via the branch point 61. It is noted that arrows 60v, 62v schematically represent, as arrow's widths, the volumes of cleaning fluid flowing in the channel 60 and the bypass passage 62 after the branch point, respectively. It is noted that, because, at this time, the vacuum suction operation is not performed, the second solenoid valve 50b and the third solenoid valve 50c are in Close (closed position). However, because the vacuum suction port 40 is in an air open state, the cleaning fluid is able to be easily delivered from the bypass passage 62 into the vacuum bottle 56.

Figure 4C:
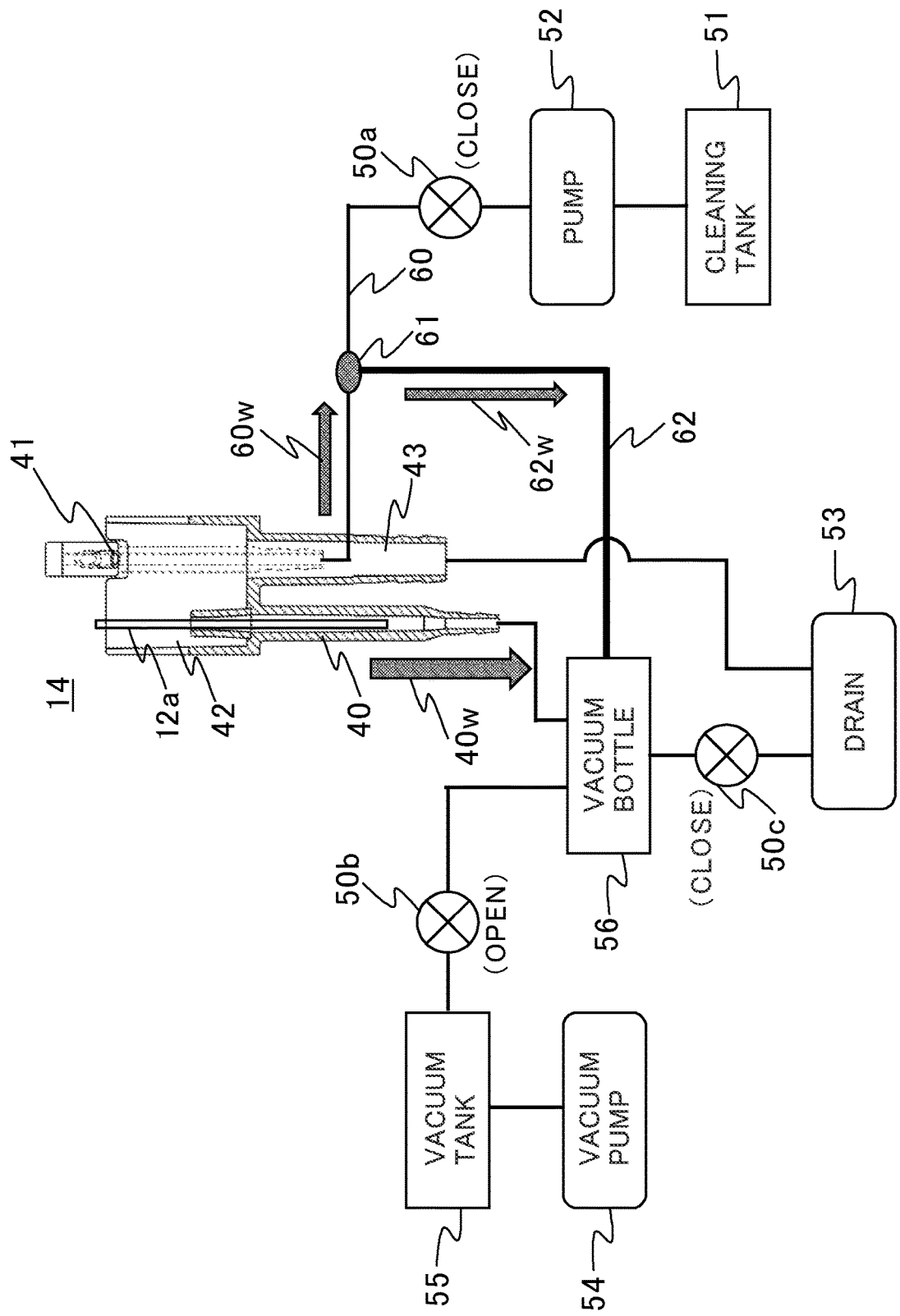
FIG. 4C is a diagram illustrating the operation of a channel configuration of a cleaning bath during vacuum suction

The movement of the cleaning fluid during the vacuum suction operation is described below with reference to FIG. 4C. For the purpose of removing the cleaning fluid adhering to the side face of the sample probe 12a, the sample probe 12a is moved to the vacuum suction port 40, and the second solenoid valve 50b is turned to Open. Then, the sample probe 12a is moved up and down to remove the cleaning fluid. At this time, for the vacuum bottle 56, a cleaning fluid 60w, a cleaning fluid 62w and a cleaning fluid 40w are drawn into the vacuum bottle 56 by the vacuum suction operation, the cleaning fluid 60w collecting in an area from the cleaning fluid outlet 41 to the branch point 61 when the exterior of the sample probe 12a is cleaned, the cleaning fluid 62w collecting in the bypass passage 62, the cleaning fluid 40w adhering to the side face of the sample probe 12a. The diameter of the cleaning fluid outlet 41 is sufficiently larger than the diameter of the vacuum suction port 40, and also a major portion of the vacuum suction port 40 is blocked with the sample probe 12a during vacuum suction. Therefore, by turning the second solenoid valve 50b to Open, the cleaning fluids 60w, 62w are able to be easily drawn into the vacuum bottle 56.

As a result, the cleaning fluid stored in the vacuum bottle 56 after the completion of the drying operation for the sample probe 12a is the sum of cleaning fluids 62v,60w, 62w and 40w. As opposed to this, in the second comparative example (FIG. 3B), the cleaning fluid collecting in the vacuum bottle 56 is only the cleaning fluid 40w. In the first example, turning the third solenoid valve 50c to Open enables washing of the valve seat of the third solenoid valve 50c with a larger amount of cleaning fluid stored in the vacuum bottle 56 than that in comparative examples, so that the solenoid valve can be prevented from having a malfunction due to dust and/or the like. Also, in comparison with the second comparative example (FIG. 3B), a newly added configuration corresponds to only an area from the branch point 61 to the bypass passage 62, which is practicable at low cost.

Figure 5:
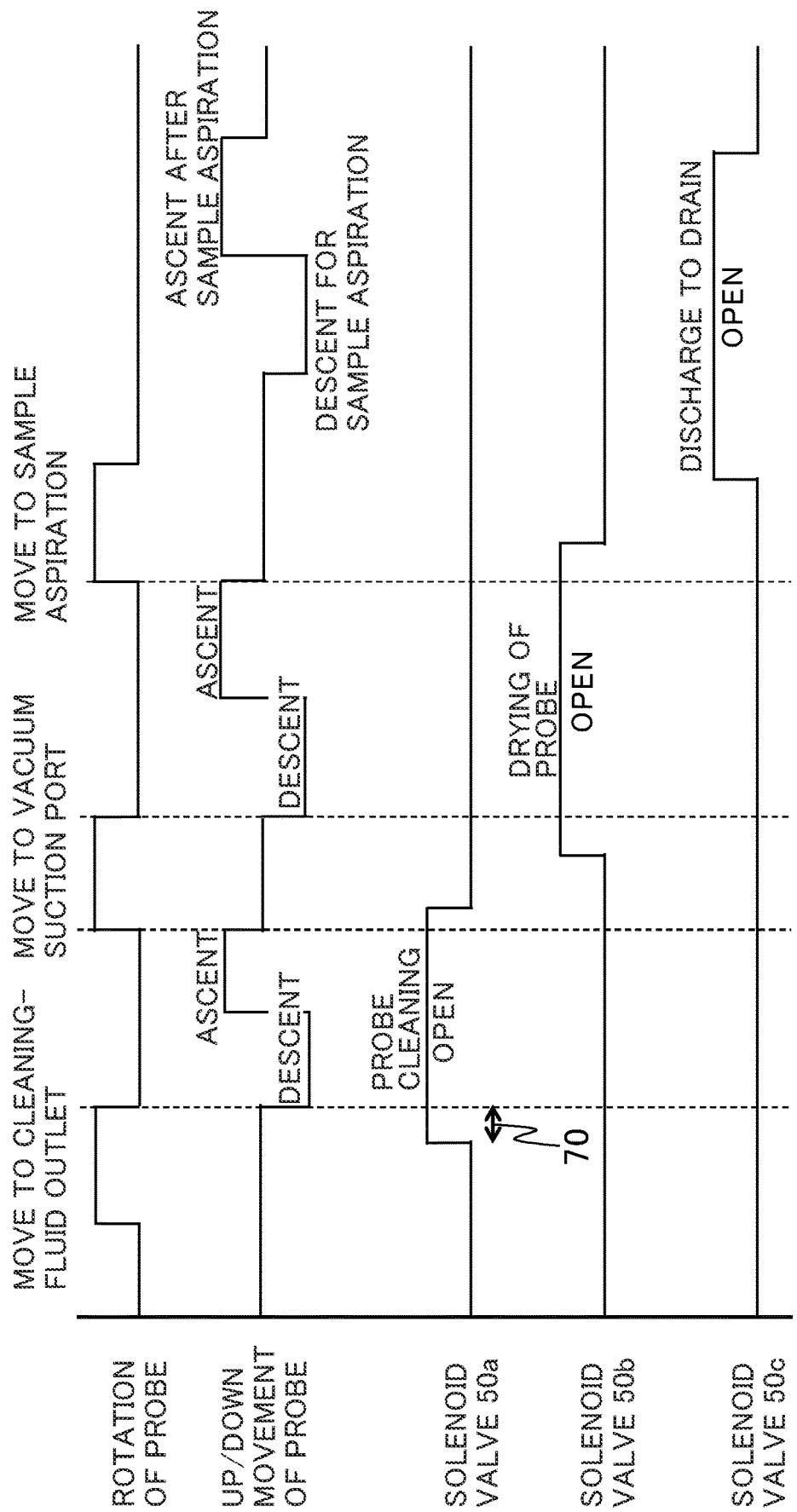
FIG. 5 is a time chart for the probe cleaning and the vacuum suction.

FIG. 5 illustrates a time chart for the above-described operation. The time chart shows the operation in a cycle defined for the cleaning bath 14 by a sequence. In the channel configuration according to the first example, after the completion of the cleaning and drying operation for the sample probe 12a, the channel from the cleaning fluid outlet 41 to the branch point 61 is placed in the state in which no cleaning fluid is left in the channel by the vacuum suction operation. Because of this, in the subsequent cycle, the first solenoid valve 50a is turned to Open before a predetermined time period 70 prior to the timing for starting the cleaning of the sample probe 12a. Thereby, the predetermined cleaning time in a cycle can be ensured, and this makes it possible to prevent contamination from occurring due to the shortage of time to clean the sample probe 12a.

The channel is designed such that, in a cycle during which a sample probe is cleaned and dried as illustrated in FIG. 5, a sufficient amount of cleaning fluid to wash the valve seat of the third solenoid valve 50c is stored in the vacuum bottle 56. For example, for flow rate adjustment to the cleaning fluid in the bypass passage 62, a throttle may be installed in the bypass passage, or otherwise a variable throttle and/or the like may be used to be able to adjust the rate of flow of the cleaning fluid. Also, it is conceivable that the channel length from the cleaning fluid outlet 41 to the branch point 61 may be long, and the like. Therefore, there is no need to draw the total cleaning fluid collecting in an area from the cleaning fluid outlet 41 to the branch point 61, into the vacuum bottle 56 while the second solenoid valve 50b is in Open. What is required is that a sufficient total amount of cleaning fluid to clean the third solenoid valve 50c during a cycle is stored in the vacuum bottle 56. It is noted that, regarding this operation, in addition to the cleaning and drying operation for a sample probe after being used for sample (analyte) aspiration, the cleaning fluid can also be stored in the vacuum bottle for each cycle and then discharged to the drain in order to clean the third solenoid valve 50c in standby cleaning operation or maintenance operation for a sample probe which is not used for sample (analyte) aspiration.

Figure 6:
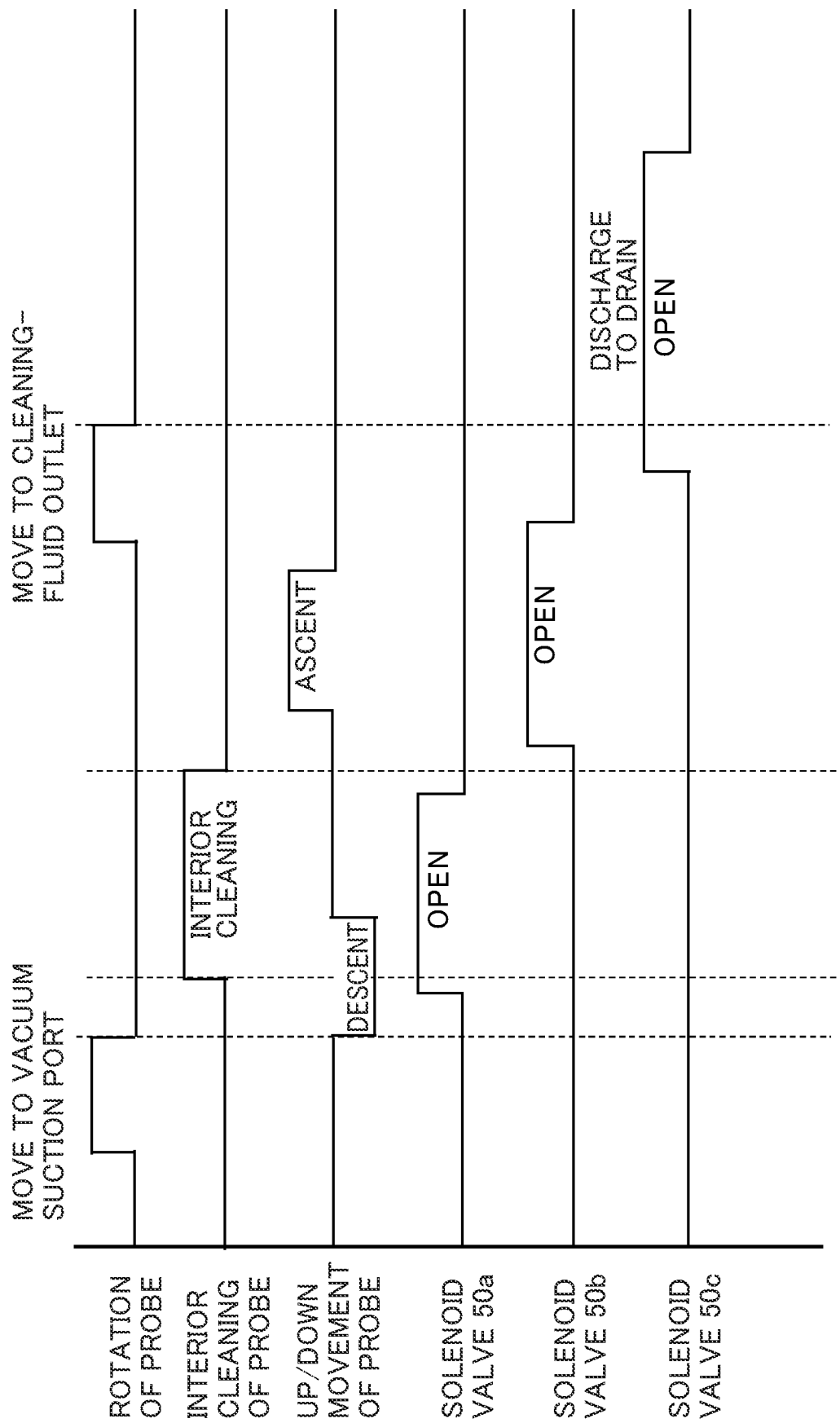
FIG. 6 is a time chart for maintenance.

FIG. 6 illustrates an example of the maintenance operation in which the interior cleaning operation for the sample probe 12a is utilized to clean the vacuum bottle 56 and the third solenoid valve 50c. FIG. 6 illustrates a time chart for such maintenance operation. If, in the maintenance operation, detergent is aspirated into the sample probe 12a for interior cleaning, this is also effective in cleaning the vacuum bottle 56 and the third solenoid valve 50c. For example, a detergent bottle is disposed between the reaction disk 1 and the sample transport mechanism 17, and the sample probe 12a aspirates the detergent from the detergent bottle. After the sample probe 12a is moved to the vacuum suction port 40, the descent operation is performed. In order to prevent the detergent from being splattered around, the sample probe 12a starts ejection after its leading end is inserted into the vacuum suction port 40. It is noted that the time to clean the interior of the sample probe 12a is set to be equal to or longer than the time to remove the detergent from the interior of the sample probe 12a. By performing the interior cleaning operation for the sample probe 12a in the vacuum suction port 40, the detergent and the cleaning fluid discharged from the sample probe 12a are able to be stored in the vacuum bottle 56. Moreover, by turning the first solenoid valve 50a to Open during descent of the sample probe 12a, the cleaning fluid from the cleaning tank 51 is able to be stored in the vacuum bottle 56 via the bypass passage 62.

After that, when the sample probe 12a is moved up, the second solenoid valve 50b is turned to Open, whereby the cleaning fluid located from the cleaning fluid outlet 41 to the branch point 61 is able to be stored in the vacuum bottle 56 via the bypass passage 62. After that, by turning the third solenoid valve 50c to Open, the cleaning fluid stored in the vacuum bottle 56 is discharged to the drain 53, thereby making it possible to wash the valve seat of the third solenoid valve 50c.

In this time chart, the detergent and the cleaning fluid used in the interior cleaning operation are supplied to the vacuum bottle 56. This makes it possible to reduce the amount of cleaning fluid to be supplied from the cleaning tank 51. In turn, while minimizing wasted cleaning fluid as a whole, a required amount of cleaning fluid can be stored in the vacuum bottle 56 in a short time.

It is noted that the use of detergent in the interior cleaning operation is optional, and similar operation to that in FIG. 6 is performed in the interior cleaning operation during the analysis operation of the automatic analyzer, whereby the cleaning fluid discharged in the interior cleaning operation for a sample probe is able to be utilized for the cleaning operation for a solenoid valve. By repeating the operation as described above, the third solenoid valve 50c is kept clean and the solenoid valve can be prevented from having a malfunction due to dust and/or the like.

FIG. 7A illustrates another channel configuration of the cleaning bath 14 according to the first example. A difference from the channel configuration in FIG. 4A is that a fourth solenoid valve 50d is disposed in the bypass passage 62.

FIG. 7B illustrate the operation of the channel configuration of the cleaning bath 14 during cleaning of the exterior of the sample probe 12a. The first solenoid valve 50a is in Open, whereas the fourth solenoid valve 50d is in Close, so that no cleaning fluid flows in the bypass passage 62. Therefore, when the sample probe 12a is cleaned, all the cleaning water 60v' supplied from the channel 60 can be allocated to cleaning of the sample probe 12a without loss of cleaning fluid.

The movement of the cleaning fluid in the vacuum suction operation is described below with reference to FIG. 7C. In order to remove the cleaning fluid adhering to the side face of the sample probe 12a, the sample probe 12a is moved to the vacuum suction port 40, and the fourth solenoid valve 50d and the second solenoid valve 50b are turned in this order to Open. Then, the sample probe 12a is moved up and down to remove the cleaning fluid. At this time, for the vacuum bottle 56, a cleaning fluid 60w' and a cleaning fluid 40w' are drawn into the vacuum bottle 56 by the vacuum suction operation, the cleaning fluid 60w' collecting in an area from the cleaning fluid outlet 41 to the branch point 61 when the exterior of the sample probe 12a is cleaned, the cleaning fluid 40w' adhering to the side face of the sample probe 12a. In this case, the cleaning fluid stored in the vacuum bottle 56 after the completion of the drying operation for the sample probe 12a is the sum of cleaning fluids 60w' and 40w', and thus, with this channel configuration, a large amount of cleaning fluid is also able to be stored in the vacuum bottle 56 in comparison with the case of the cleaning fluid 40w' in the second comparative example (FIG. 3B). As a result, the third solenoid valve 50c is turned to Open after the completion of the drying operation for the sample probe 12a. This makes it possible to wash the valve seat of the third solenoid valve 50c with the cleaning fluid stored in the vacuum bottle 56, so that the solenoid valve can be prevented from having a malfunction due to dust and/or the like. Also, in the channel configuration, the cleaning fluid supplied from the cleaning tank 51 is ejected directly from the cleaning fluid outlet 41, so that a further reduction in exterior cleaning time is enabled.

Figure 8:
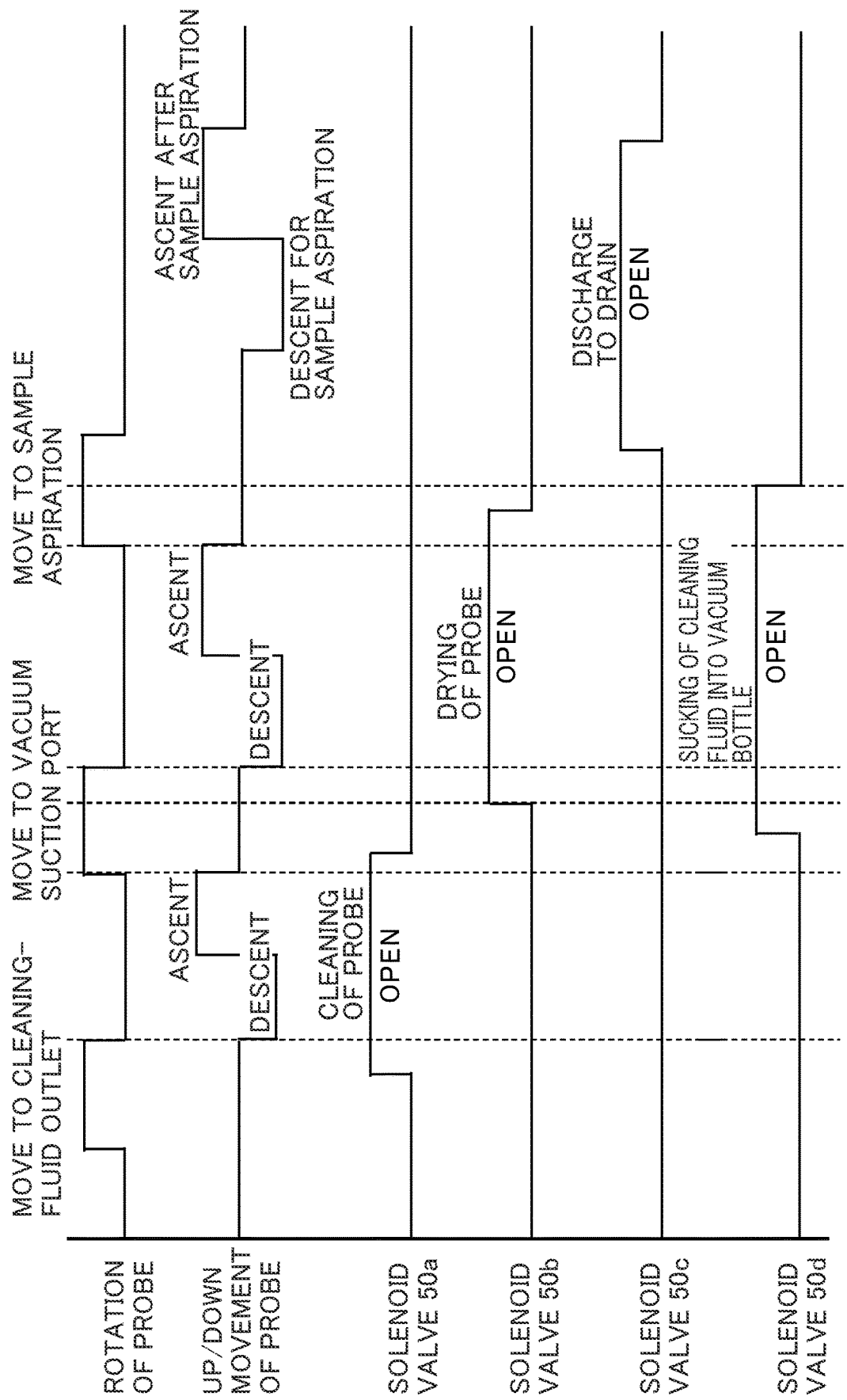
FIG. 8 is a time chart for the probe cleaning and the vacuum suction.

FIG. 8 illustrates a time chart of the above-described operation, which is similar to the time chart in FIG. 5, except for the control on the fourth solenoid valve 50d. Therefore, a similar description is omitted. It is noted that this operation can be similarly applied to standby cleaning operation or maintenance operation for a sample probe which is not used for sample (analyte) aspiration, in addition to the cleaning and drying operation for a sample probe after being used for sample (analyte) aspiration.

Figure 9:
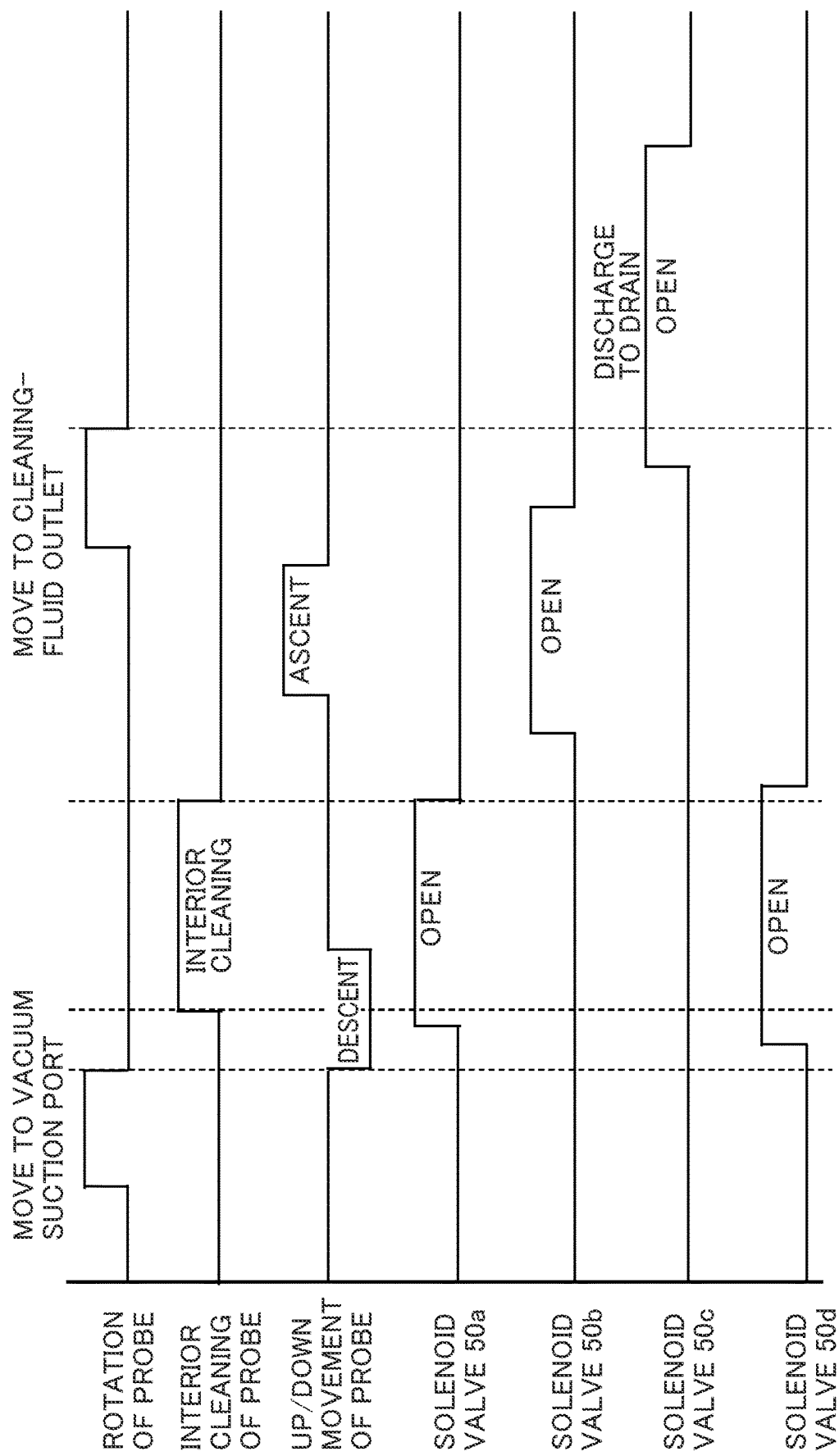
FIG. 9 is a time chart for maintenance.

FIG. 9 illustrates an example where, in the maintenance operation, the interior cleaning operation for the sample probe 12a is utilized to clean the vacuum bottle 56 and/or the third solenoid valve 50c. A time chart is the same time chart for executing the maintenance operation as that in FIG. 6. Therefore, except for the control on the fourth solenoid valve 50d, the time chart is similar to that in FIG. 6, and a similar description is omitted. During the time period in which the first solenoid valve 50a is in Open, the fourth solenoid valve 50d is also placed in Open such that the cleaning fluid from the cleaning tank 51 is stored in the vacuum bottle 56 through the bypass passage 62. At this time, the cleaning fluid discharged from the cleaning fluid outlet 41 is directly discharged to the drain. Therefore, the period of time that the fourth solenoid valve 50d is in Open desirably includes margins before and after the period of time that the first solenoid valve 50a is in Open.

Second Example

Figure 10:
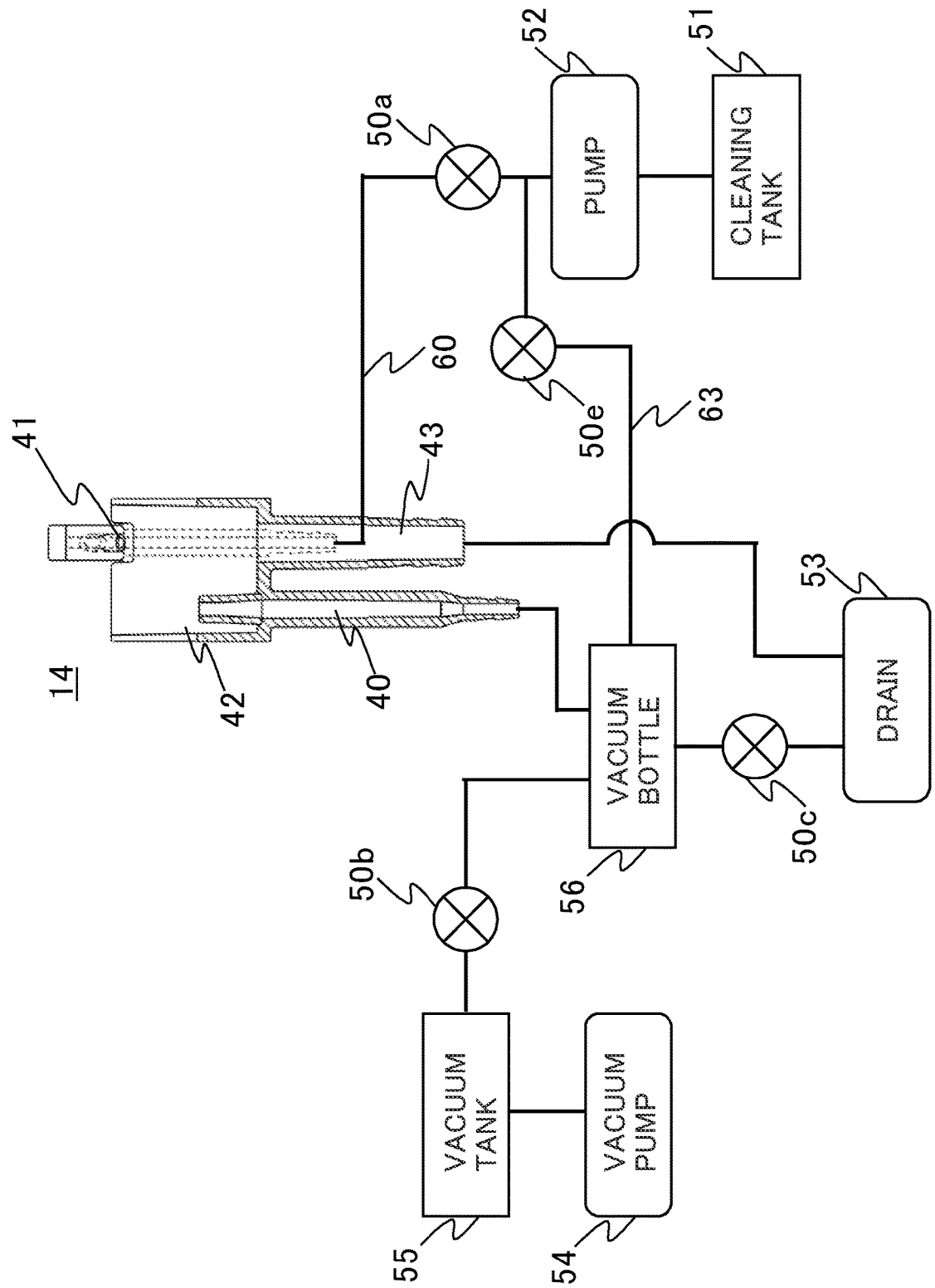
FIG. 10 is a diagram illustrating a channel configuration of a cleaning bath (second example).

FIG. 10 illustrates a channel configuration of the cleaning bath 14 according to a second example. The channel configuration according to the second example includes a channel 63 through which the cleaning fluid in the cleaning tank 51 is supplied to the vacuum bottle 56 by the pump 52. A destination of the cleaning fluid from the cleaning tank 51 is selected from between the cleaning fluid outlet 41 and the vacuum bottle 56. For this selection, the first solenoid valve 50a is installed in the channel 60 between the pump 52 and the cleaning fluid outlet 41, and the fifth solenoid valve 50e is installed in the channel 63 between the pump 52 and the vacuum bottle 56.

In the channel configuration according to the second example, the fifth solenoid valve 50e is controlled such that the amount of cleaning fluid required to wash the valve seat of the third solenoid valve 50c flows from the cleaning tank 51 to collect in the vacuum bottle 56 during a cycle. In the channel configuration, the total cleaning fluid supplied from the pump 52 is supplied to the vacuum bottle 56. This enables supplying a required amount of cleaning fluid to the vacuum bottle 56 in a short time. A time chart in the second example is not illustrated in particular. However, the period of time that the fifth solenoid valve 50e is in Open during a cycle may be determined to avoid an overlap with the period of time that the cleaning fluid is supplied from the cleaning tank 51 to the cleaning fluid outlet 41, that is, the period of time that the first solenoid valve 50a is placed in Open for probe cleaning.

Although the present invention has been described in detail based on embodiments, the present invention is not limited to the embodiments as described above, and it should be understood that various changes may be made without departing from the spirit and scope of the invention. For example, the cleaning bath for the sample probe has been described as an example embodiment. However, because of the technology applicable to the configuration that requires the vacuum suction operation after probe cleaning, the technology is also applicable to a cleaning bath for a reagent probe and the like.

Further, in the examples, the description has been provided for the case where the descent and ascent operation is performed on the sample probe in the cleaning operation performed after the sample probe is moved to the cleaning fluid outlet. However, even if the sample probe is not required to be moved up and down because of a small cleaning range, the cleaning fluid adhering to the side face of the sample probe is removed at the vacuum suction position. Therefore, the advantageous effects of the present examples are not subject to limitations by the cleaning operation for the sample probe.

LIST OF REFERENCE SIGNS

1 . . . Reaction disk
2 . . . Reaction container
3 . . . Cleaning mechanism
4 . . . Spectrophotometer
4a . . . Light source
5, 6 . . . Agitation mechanism
7, 8 . . . Reagent dispense mechanism
7a, 8a . . . Reagent probe
9 . . . Reagent disk
10 . . . Reagent bottle
11, 12 . . . Sample dispense mechanism
11a, 12a . . . Sample probe
13, 14 . . . Cleaning bath
15 . . . Sample container
16 . . . Rack
17 . . . Sample transport mechanism
18, 18a . . . Reagent syringe
19, 19a . . . Sample syringe
20 . . . Cleaning pump
21 . . . Controller
30, 31 . . . Agitation mechanism cleaning bath
32, 33 . . . Reagent dispense mechanism cleaning bath
40 . . . Vacuum suction port
41 . . . Cleaning fluid outlet
42 . . . Bath
43 . . . Drainage tube
50a, 50b, 50c, 50d, 50e . . . Solenoid valve
43 . . . Drainage tube
51 . . . Cleaning tank
52 . . . Pump
53 . . . Drain
54 . . . Vacuum pump
55 . . . Vacuum tank
56 . . . Vacuum bottle
60 . . . Channel
61 . . . Branch point
62 . . . Bypass passage
60v, 60v', 62v, 40w, 40w', 60w, 62w, 62w' . . . Cleaning fluid (flow rate)
70 . . . Predetermined time period

The invention claimed is:

1. An automatic analyzer, comprising:
a cleaning bath that has a cleaning fluid outlet from which cleaning fluid is discharged for cleaning a probe, and a vacuum suction port, which suctions fluid, into which the probe is inserted;
a cleaning tank that stores the cleaning fluid;
a vacuum tank;
a vacuum pump that causes the vacuum tank to be placed under negative pressure with respect to atmospheric pressure;
a vacuum bottle disposed between the vacuum suction port and the vacuum tank;
a pump that supplies the cleaning fluid, stored in the cleaning tank, to the cleaning fluid outlet;
a first solenoid valve that is disposed between the pump and the cleaning fluid outlet;
a second solenoid valve that is disposed between the vacuum tank and the vacuum bottle;
a first channel that connects between the vacuum suction port and the vacuum bottle;

a second channel that is a bypass passage connecting the vacuum bottle and a branch point on a channel between the first solenoid valve and the cleaning fluid outlet, wherein, by opening the second solenoid valve, the cleaning fluid flows into the vacuum bottle from the first channel and the second channel.

2. The automatic analyzer according to claim 1, wherein the cleaning bath has a bath into which the cleaning fluid is discharged from the cleaning fluid outlet, and wherein the vacuum suction port is installed in a bottom of the bath, and when the bath is viewed from above, the vacuum suction port is located in a different position from a position in which the cleaning fluid is discharged from the cleaning fluid outlet.

3. The automatic analyzer according to claim 1, further comprising a third solenoid valve that is installed between the vacuum bottle and a drain.

4. The automatic analyzer according to claim 3, further comprising a controller, wherein the controller is configured to open the first solenoid valve before a predetermined time period prior to cleaning start timing of the exterior of the probe defined by a sequence.

5. The automatic analyzer according to claim 4, wherein the controller is configured to:

open the second solenoid valve after completion of the cleaning of the exterior of the probe, insert the probe into the vacuum suction port, and then move the probe upward and downward to remove the cleaning fluid adhering to an exterior of the probe.

6. The automatic analyzer according to claim 5, wherein the controller is configured to open the third solenoid valve after the probe is moved from the vacuum suction port.

7. The automatic analyzer according to claim 5, further comprising a fourth solenoid valve that is installed on the bypass passage, wherein the controller is configured to close the fourth solenoid valve during a period of time that the exterior of the probe is cleaned, and, after the completion of the cleaning of the exterior of the probe, open the fourth solenoid valve prior to the second solenoid valve.

8. The automatic analyzer according to claim 4, wherein the controller is configured to move the probe to the vacuum suction port for an interior cleaning operation to clean an interior of the probe.

9. The automatic analyzer according to claim 8, wherein the controller is configured to cause the probe to aspirate a detergent for the interior cleaning operation.

10. The automatic analyzer according to claim 8, wherein the controller is configured to open the first solenoid valve during the interior cleaning operation for the probe.

11. The automatic analyzer according to claim 1, wherein the probe is a sample probe.

12. The automatic analyzer according to claim 1, wherein, by opening the second solenoid valve, the cleaning fluid that adheres to a side face of the probe flows into the vacuum tank from the first channel, and the cleaning fluid that collects in an area from the cleaning fluid outlet to the branch point with the first solenoid valve closed, and the cleaning fluid that collects in the bypass passage flow into the vacuum tank from the second channel.

13. The automatic analyzer according to claim 1, wherein opening and closing of the second solenoid valve are performed in operation in a cycle for the cleaning bath.

* * * * *